(12) United States Patent
Zusman

(10) Patent No.: US 10,866,256 B2
(45) Date of Patent: Dec. 15, 2020

(54) UNIVERSAL SENSOR MOUNT

(71) Applicant: George V. Zusman, Orchard Park, NY (US)

(72) Inventor: George V. Zusman, Orchard Park, NY (US)

(*) Notice: Subject to any disclaimer, the term of this patent is extended or adjusted under 35 U.S.C. 154(b) by 208 days.

(21) Appl. No.: 16/041,487

(22) Filed: Jul. 20, 2018

(65) Prior Publication Data

US 2020/0025785 A1  Jan. 23, 2020

(51) Int. Cl.
*G01D 11/30* (2006.01)
*G01P 1/02* (2006.01)
*G01P 21/00* (2006.01)
*G01P 1/07* (2006.01)
*G01C 21/16* (2006.01)
*G01P 15/18* (2013.01)
*G01P 15/08* (2006.01)

(52) U.S. Cl.
CPC .............. *G01P 1/023* (2013.01); *G01D 11/30* (2013.01); *G01P 1/07* (2013.01); *G01P 21/00* (2013.01); *G01C 21/165* (2013.01); *G01P 15/0802* (2013.01); *G01P 15/18* (2013.01)

(58) Field of Classification Search
CPC ....... G01D 11/30; F16M 2200/02–022; F16M 11/02–18
See application file for complete search history.

(56) References Cited

U.S. PATENT DOCUMENTS

| | | | | |
|---|---|---|---|---|
| 3,211,405 A | * | 10/1965 | Fey | F16M 11/2014 248/183.2 |
| 3,712,571 A | * | 1/1973 | Miller | F16M 11/10 248/183.2 |
| 3,725,696 A | * | 4/1973 | Morton | F21S 13/10 362/399 |
| 3,870,265 A | * | 3/1975 | Osborne | F16M 11/10 248/183.2 |
| 3,913,880 A | * | 10/1975 | Lucasey | E05B 73/0082 248/415 |
| 4,305,266 A | * | 12/1981 | Lockwood | E05B 73/0082 248/553 |
| 4,341,452 A | * | 7/1982 | Korling | F16M 11/105 248/179.1 |
| 4,666,353 A | * | 5/1987 | Micek | B23B 31/36 279/158 |

(Continued)

*Primary Examiner* — Alexander A Mercado
(74) *Attorney, Agent, or Firm* — Walter W. Duft

(57) ABSTRACT

A universal sensor mount for mounting a sensor module to a machine in a precise orientation and a corresponding sensor module installation method. The universal sensor mount includes a main body having a central main axis. A machine mounting member extends from the main body in a first direction substantially parallel to the main axis for attachment to the machine. A threaded sensor module mounting member extends from the main body in a second direction substantially parallel to the main axis for threaded attachment to the sensor module. The sensor module mounting member is rotatable relative to the main body. An adjustable locking member in the main body is operable to lock the sensor module mounting member in a selected rotational position. The selected rotational position of the sensor module mounting member determines a rotational position of the sensor module when it is attached to the sensor module mounting member.

20 Claims, 5 Drawing Sheets

(56) References Cited

U.S. PATENT DOCUMENTS

| | | | | |
|---|---|---|---|---|
| 4,771,637 A * | 9/1988 | Kubler | G01H 1/00 | 73/493 |
| 4,787,613 A * | 11/1988 | Hayes | B25B 1/22 | 269/72 |
| 4,817,417 A * | 4/1989 | Twerdochlib | F16B 19/02 | 73/660 |
| 4,818,135 A * | 4/1989 | Desjardins | F16B 7/1472 | 248/413 |
| 4,858,470 A * | 8/1989 | Kincaid | G01H 1/00 | 73/654 |
| 4,974,802 A * | 12/1990 | Hendren | F16C 11/106 | 248/181.1 |
| 5,039,043 A * | 8/1991 | Hodge | B01L 9/00 | 248/125.8 |
| 5,116,004 A * | 5/1992 | Luecke | F16M 11/28 | 248/157 |
| 5,408,894 A * | 4/1995 | Henson | G01D 11/30 | 73/866.5 |
| 5,419,522 A * | 5/1995 | Luecke | F16C 11/106 | 248/288.51 |
| 5,454,042 A * | 9/1995 | Drever | F16M 13/04 | 381/361 |
| 5,636,703 A * | 6/1997 | Papke | B62D 15/02 | 180/400 |
| 5,664,750 A * | 9/1997 | Cohen | F16M 11/041 | 248/229.15 |
| 5,691,707 A * | 11/1997 | Smith | F16C 33/6622 | 184/108 |
| 5,775,652 A * | 7/1998 | Crawshaw | F21V 21/088 | 248/230.6 |
| 6,202,491 B1 * | 3/2001 | McCarty | G01D 9/005 | 73/659 |
| 6,234,690 B1 * | 5/2001 | Lemieux | F16M 11/041 | 248/187.1 |
| 6,435,902 B1 | 8/2002 | Groh et al. | | |
| 6,679,467 B1 * | 1/2004 | Softness | F16M 11/10 | 248/278.1 |
| 8,567,269 B1 * | 10/2013 | Dutel | G01D 11/30 | 73/866.5 |
| 8,572,849 B1 * | 11/2013 | Clark | F16M 11/14 | 29/897.2 |
| 8,783,975 B1 * | 7/2014 | Cifers | F16M 11/24 | 396/428 |
| 9,199,360 B2 * | 12/2015 | Piety | B25B 13/48 | |
| 2004/0093753 A1 * | 5/2004 | McInroy | G01D 11/10 | 33/613 |
| 2004/0155159 A1 * | 8/2004 | Tiffen | F16M 11/2014 | 248/177.1 |
| 2005/0265711 A1 * | 12/2005 | Heibel | F16M 11/42 | 396/419 |
| 2006/0016945 A1 * | 1/2006 | Taylor | A47B 19/06 | 248/188.5 |
| 2006/0115337 A1 * | 6/2006 | Higashi | B23B 31/026 | 408/181 |
| 2006/0118690 A1 * | 6/2006 | Cavell | A47G 25/06 | 248/343 |
| 2006/0239677 A1 * | 10/2006 | Friedrich | F16M 11/043 | 396/419 |
| 2008/0023607 A1 * | 1/2008 | Barker | G03B 17/563 | 248/288.51 |
| 2011/0019081 A1 * | 1/2011 | Eynav | A45F 5/021 | 348/376 |
| 2011/0089296 A1 * | 4/2011 | Joanisse | F16M 11/14 | 248/181.1 |
| 2011/0101192 A1 * | 5/2011 | Lee | F16C 11/106 | 248/346.03 |
| 2011/0164870 A1 * | 7/2011 | Manson | F16M 11/18 | 396/428 |
| 2011/0188925 A1 * | 8/2011 | Komine | F16C 11/106 | 403/83 |
| 2012/0237196 A1 * | 9/2012 | Li | F16M 11/14 | 396/428 |
| 2012/0294672 A1 * | 11/2012 | Hicks | F16M 11/04 | 403/299 |
| 2012/0301131 A1 * | 11/2012 | Johnson | G03B 17/561 | 396/428 |
| 2013/0153737 A1 * | 6/2013 | Zoeteman | A45B 23/00 | 248/513 |
| 2013/0168275 A1 * | 7/2013 | Hennessey | G06F 1/1626 | 206/320 |
| 2013/0193288 A1 * | 8/2013 | Congdon | F16M 11/2078 | 248/231.41 |
| 2013/0313384 A1 * | 11/2013 | Nakatani | F16M 11/2014 | 248/178.1 |
| 2014/0138507 A1 * | 5/2014 | Hennessey | F16M 13/022 | 248/276.1 |
| 2014/0218793 A1 * | 8/2014 | Mcmahon | G01N 3/42 | 359/385 |
| 2014/0226962 A1 * | 8/2014 | Henry | G03B 17/561 | 396/423 |
| 2014/0234015 A1 * | 8/2014 | Kallas | F16M 11/2078 | 403/90 |
| 2015/0001365 A1 * | 1/2015 | Vogt | F16C 11/106 | 248/371 |
| 2015/0003820 A1 * | 1/2015 | Li | F16M 11/08 | 396/428 |
| 2015/0358523 A1 * | 12/2015 | Mohr | F16F 15/08 | 348/208.7 |
| 2016/0091780 A1 * | 3/2016 | Tiefenbrunn | F16M 11/14 | 396/419 |
| 2016/0169672 A1 * | 6/2016 | Ottl | G02B 23/16 | 356/247 |
| 2016/0266601 A1 * | 9/2016 | Christensen | G05G 5/04 | |
| 2017/0167558 A1 * | 6/2017 | Battek | F16H 25/2454 | |
| 2017/0248451 A1 * | 8/2017 | Ginet | G01D 11/30 | |
| 2017/0248553 A1 * | 8/2017 | Potts | G01N 29/225 | |
| 2017/0276291 A1 * | 9/2017 | Subratie | F16M 13/02 | |
| 2017/0337789 A1 * | 11/2017 | Rosenkvist | G03B 17/561 | |
| 2018/0299061 A1 * | 10/2018 | Neundorf | G01S 17/89 | |
| 2018/0367713 A1 * | 12/2018 | Gilbert | H04N 5/2253 | |
| 2019/0101560 A1 * | 4/2019 | Lee | G01P 1/02 | |
| 2019/0250251 A1 * | 8/2019 | Gibson | G01S 17/10 | |
| 2019/0368653 A1 * | 12/2019 | Olinger | G03B 17/561 | |
| 2020/0145035 A1 * | 5/2020 | Sasaki | B60R 16/0238 | |
| 2020/0218139 A1 * | 7/2020 | Tiefenbrunn | F16M 11/08 | |

* cited by examiner

UNIVERSAL SENSOR MOUNT

BACKGROUND

1. Field

The present disclosure relates to sensor mount devices for attaching sensors to machinery. More particularly, the disclosure is directed to sensor mounts for machinery sensors that need to be mounted in a particular orientation.

2. Description of the Prior Art

By way of background, sensors have long been used to measure vibrations and other operational characteristics of machines such as engines, motors, pumps, etc. Some types of machinery sensors need to mounted in a particular orientation relative to the machine being monitored. One example is two-axis and three-axis MEMS accelerometers used to detect machine-critical acceleration vector components. Another example is sensors with side connectors or cables whose orientation is restricted by space limitations.

Previous attempts to address this problem include mounting the sensor using a central bolt that extends through the sensor and threads into a bore on the machine body. This requires a relatively large-diameter through-hole (e.g., 0.375-0.5 in.) to accommodate the bolt, which makes the sensor more bulky and expensive to manufacture. In other cases, proper sensor orientation has been achieved by simply gluing the sensor to the machine body. This makes it difficult to remove the sensor if it needs to be replaced. There are also proprietary sensor mounts designed for specific sensors, but these lack versatility.

Applicant discloses herein a universal sensor mount that can be used to mount a wide variety of machinery sensors in very specific and highly controllable orientations.

SUMMARY

Disclosed herein is a universal sensor mount for mounting a sensor module to a machine in a precise orientation relative to one or more machine reference axes, along with a corresponding sensor module mounting method.

In an embodiment, the universal sensor mount includes a main body having a central main axis. A machine mounting member extends from the main body in a first direction substantially parallel to the main axis for attachment to the machine. A threaded sensor module mounting member extends from the main body in a second direction substantially parallel to the main axis for threaded attachment to the sensor module. The sensor module mounting member is rotatable relative to the main body. An adjustable locking member in the main body is operable to lock the sensor module mounting member in a selected rotational position. The selected rotational position of the sensor module mounting member determines a rotational position of the sensor module relative to the one or more machine reference axes when it is threadably attached to the sensor module mounting member.

In an embodiment, the sensor module mounting method includes providing the universal sensor mount and attaching it to a machine using the machine mounting member. The sensor module mounting member is locked in a selected rotational position using the adjustable locking member. The sensor module is attached to the universal sensor mount by threading the sensor module onto the sensor module mounting member until tight. A determination is made whether the sensor module is substantially aligned with one or more reference axes of the machine. If not, the sensor module is detached from the universal sensor mount and the sensor module mounting member is unlocked and rotated to another selected rotational position that will substantially align the sensor module with the one or more machine reference axes. The sensor module mounting member is then relocked in the another selected rotational position and sensor module is reattached to the universal sensor mount.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
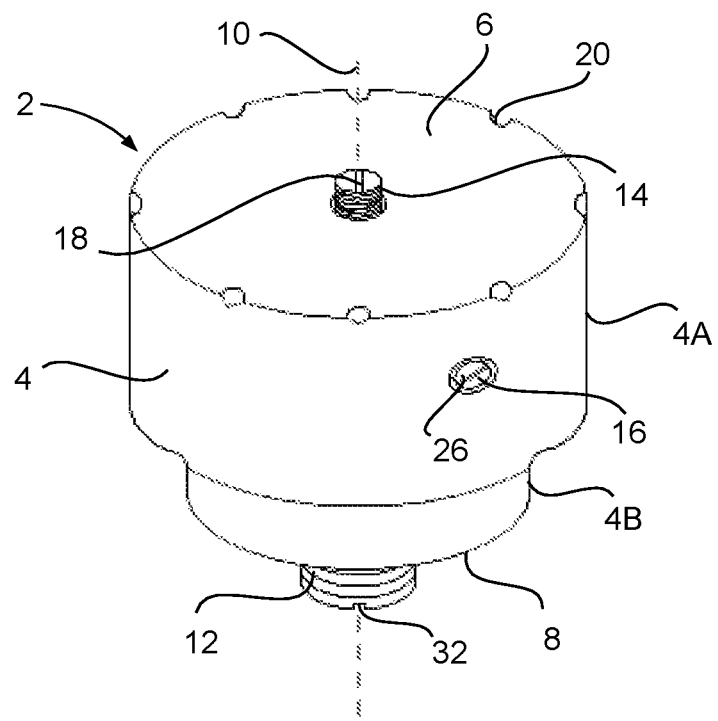
FIG. 1 is a perspective view showing a universal sensor mount constructed in accordance with an embodiment of the present disclosure.

Turning now to the drawing figures, which are not necessarily to scale, like reference numbers will be used to represent like elements in all of the several views. FIG. 1 illustrates a universal sensor mount 2 constructed according to one possible embodiment of the disclosed subject matter. Unless otherwise indicated, the universal sensor mount 2 and its various components now to be described may be manufactured from any suitable material, including metals such as steel or aluminum, various polymers, metal/polymer combinations, etc., depending on the intended environment in which the sensor mount will be used.

In the illustrated embodiment, the universal sensor mount 2 includes a generally cylindrical main body 4 having a first end 6, a second end 8, and a central main axis 10. If desired, the main body 4 may have defined sections 4A and 4B of different diameter, but this is a matter of design choice rather than a requirement. Indeed, the use of a generally cylindrical configuration is itself a design choice, and should not be construed as in any way limiting of the scope of the present disclosure. Persons skilled in the art will understand from the disclosure herein that the main body 4 may be virtually any shape or size so long as the chosen configuration is compatible with the intended application of the universal sensor mount 2.

A machine mounting member 12 extends in a first direction that is substantially parallel to the main axis 10. In the illustrated embodiment, the machine mounting member 12 is substantially aligned with the main axis 10, but non-aligned positioning could also be used. The machine mounting member 12 is used for attachment of the universal sensor mount 2 to a machine (not shown in FIG. 1), such as a motor, a pump, or any other type of machinery having operational characteristics that are to be monitored by a sensor. In an embodiment, the machine mounting member 12 may have a diameter of between about 0.375-0.5 in. and may project from the second 8 by a length of between about 0.25-0.375 in. Different sizes could be used in other embodiments.

A threaded sensor module mounting member 14 extends in a second direction substantially parallel to the main axis 10. In the illustrated embodiment, the sensor module mounting member 14 is substantially aligned with the main axis 10, but non-aligned positioning could also be used. The sensor module mounting member 14 is used for attachment of the universal sensor mount 2 to a sensor module (not shown in FIG. 1) designed to sense machinery operational characteristics. In an embodiment, the sensor module mounting member 14 may have a diameter of between about 0.125-0.25 in. and may project from the second 8 by a length of between about 0.0625-0.1875 in. Different sizes could be used in other embodiments.

As described in more detail below, the universal sensor mount 2 is particularly advantageous for use with sensor modules that need to mounted in a particular orientation relative to the machinery being monitored. One example is two-axis and three-axis MEMS accelerometers used to detect machine-critical acceleration vector components. Another example is sensor modules with side connectors or cables whose orientation is constrained by space limitations.

The sensor module mounting member 14 is rotatable relative to the main body 4. An an adjustable locking member 16 in the main body 4 is operable to lock the sensor module mounting member 14 in a selected rotational position. As described in more detail below, the selected rotational position of the sensor module mounting member 14 determines a rotational position of the sensor module when it is threadably attached to the sensor module mounting member.

Figure 2:
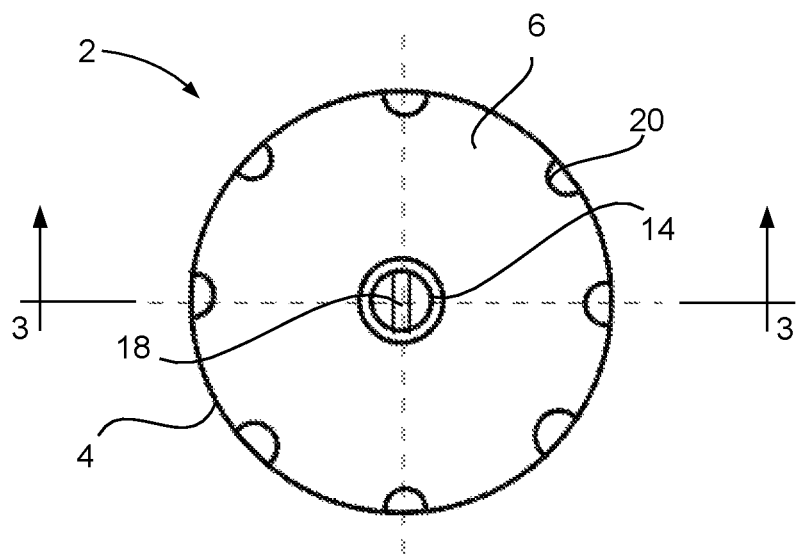
FIG. 2 is a top view of the universal sensor mount of FIG. 1.

With additional reference now to FIG. 2, the sensor module mounting member 14 may include a rotation-indicating pointer 18 for visually indicating the sensor module mounting member's selected rotational position. This helps facilitate accurate rotational positioning of the sensor module mounting member 14. In the illustrated embodiment, the rotation-indicating pointer 18 is formed as a rotation-tool-receiving key configured to be engaged by a rotation tool for rotating the sensor module mounting member 14. In particular, the rotation-indicating pointer 18 is embodied as a slot that can be engaged by a flat-bladed screwdriver.

To further facilitate accurate rotational positioning of the sensor module mounting member 14, the main body 4 may include rotation-indicating markings 20 on the first end 6 that the rotation-indicating pointer 18 selectively points to at different rotational positions of the sensor module mounting member. In the illustrated embodiment, the rotation-indicating markings 20 are formed as notches that are evenly spaced around the peripheral edge of the main body first side 6. Other types of rotation-indicating markings could also be used, such as painted-on rotation indicia. Although FIGS. 1 and 2 show eight notches that are spaced from one another at 45 degree angles, the number and spacing of the notches could vary.

Figure 3:
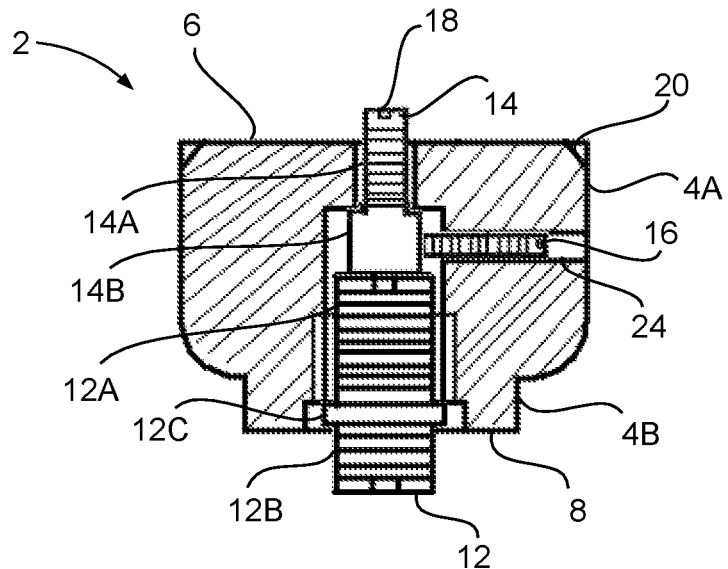
FIG. 3 is a combination cross-sectional view/side view of the universal sensor mount of FIG. 1, with a main body of the sensor mount being shown in a cross-section taken along line 3-3 in FIG. 2 and the remaining components being shown as a side elevation.
Figure 4:
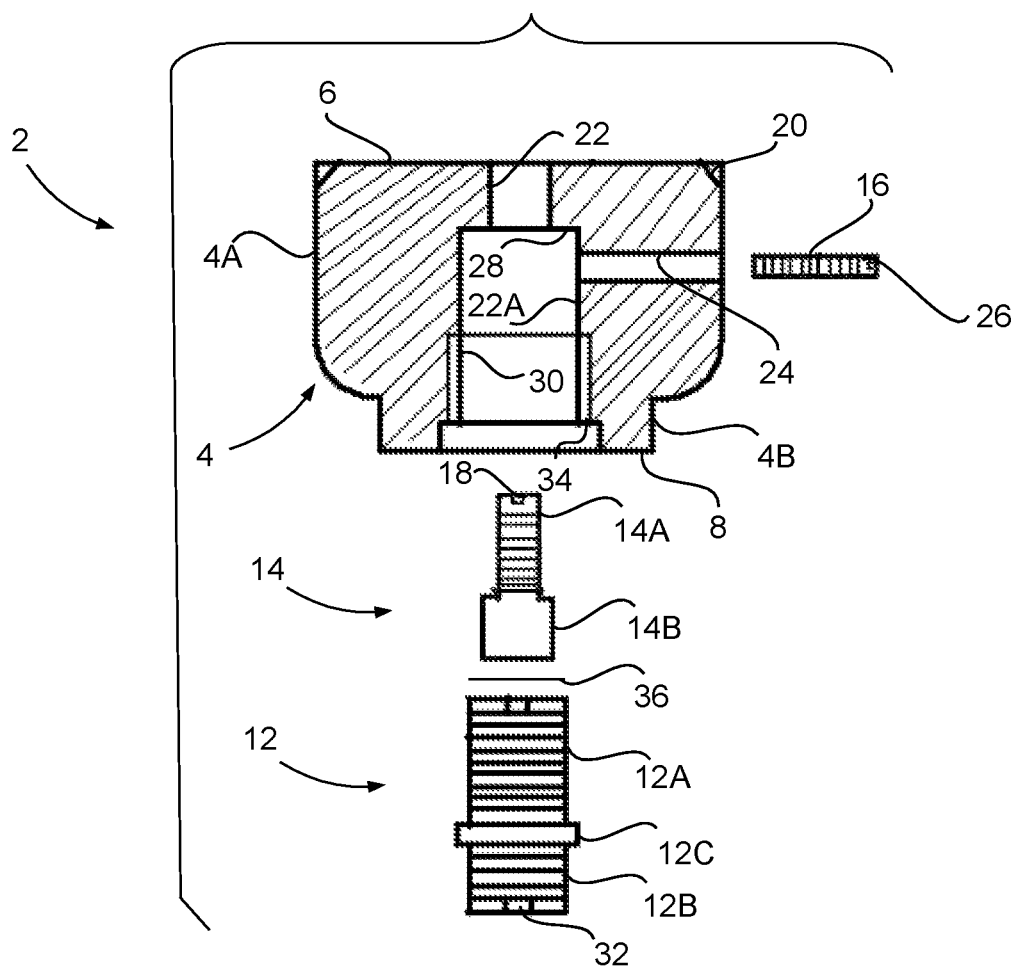
FIG. 4 is an exploded combination cross-sectional view/side view of the universal sensor mount of FIG. 1, with a main body of the sensor mount being shown in a cross-section taken along line 3-3 in FIG. 2 and the remaining components being shown as a side elevation.

Turning now to FIGS. 3 and 4, the sensor module mounting member 14 may include a threaded shaft 14A and an enlarged head 14B. A base portion of the threaded shaft 14A is disposed within a first main body bore 22 (see FIG. 4) extending axially within the main body 4 and opening at the main body first end 6. A free-end portion of the threaded shaft 14A extends out of the first main body bore 22 and beyond the main body first end 6 as a threaded post. The adjustable locking member 16 may be formed as a threaded shaft or post extending within a second main body bore 24 that intersects the first main body bore 22. The threaded shaft that provides the adjustable locking member 16 may include a rotation-tool-engaging key, such as a screwdriver slot 26 (see FIG. 4), to facilitate shaft rotation. The slot 26 is also shown in FIG. 1. The adjustable locking member 16 is threadably adjustable to selectively engage and disengage the sensor module mounting member 14. FIG. 3 illustrates the engagement position in which the sensor module mounting member 14 is locked against rotation, with the adjustable locking member acting like a set screw.

The enlarged head portion 14B of the sensor module mounting member 14 is disposed within an enlarged portion 22A (see FIG. 4) of the first main body bore 22 that opens at the main body second end 8. As noted above, the remainder of the sensor module mounting member 14 is the threaded shaft 14A that extends through and out of the first main body bore 22 beyond the main body first end 6. In an embodiment, the sensor module mounting member 14 may be implemented as a threaded bolt.

The sensor module mounting member 14 inserts into the first main body bore 22 from the second end 8 of the main body. The sensor module mounting member 14 is axially constrained against disengaging from the main body 4 via the first end 6 thereof by virtue of the enlarged head portion 14B engaging a first shoulder 28 (see FIG. 4) of the first main body bore 22. The first shoulder 28 defines a closed end of the enlarged portion 22A of the first main body bore 22. The sensor module mounting member 14 is axially constrained against disengaging from main body 4 via the second end 8 thereof by virtue of the machine mounting member 12.

The machine mounting member 12 may be mounted to the main body 4 in various ways. In the illustrated embodiment, the machine mounting member 12 is threadably attached so as to be removable from the main body. In particular, the machine mounting member 12 includes a first end portion 12A that is threadably attached to a threaded region 30 (see FIG. 4) of the enlarged portion 22A of the first main body bore 22. In other embodiments, the machine mounting member 12 could be permanently attached to main body 4, such as by press-fitting it into the enlarged portion 22A of the first main body bore 22. In still other embodiments, the machine mounting member 12 and the main body 4 could be part of a single monolithic structure. In that case, the sensor module mounting member 14 could insert into the first main body bore 22 from the first end 6 of the main body 4. A suitable retainer, such as a snap ring, could then be used to axially constrain the sensor module mounting member 14 against disengaging from the main body 4 via the first end 6.

The machine mounting member 12 may include a second end portion 12B having a rotation-tool-receiving configuration arranged to be engaged by a rotation tool that rotationally advances the machine mounting member into the enlarged portion 22A of the first main body bore 22. In the illustrated embodiment, the rotation-tool-receiving configuration is formed as a rotation-tool-engaging key, such as a screwdriver slot 32 (see FIG. 4). The slot 32 is also shown in FIG. 1.

The machine mounting member 12 may further include an intermediate flange 12C disposed between its first and second end portions 12A and 12B. The intermediate flange 12C seats on a second shoulder 34 (see FIG. 4) of the first main body bore 22. The second shoulder 34 defines an open end of the enlarged portion 22A of the first main body bore 22 at the main body second end 8.

The machine mounting member first end portion 12A may either directly or indirectly engage the enlarged head portion 14B of the sensor module mounting member 14 when the intermediate flange 12C seats against the second shoulder 34 of the first main body bore 22. This engagement axially constrains the sensor module mounting member from moving toward the second end 8 of the main body 4. FIG. 4 illustrates one type of indirect engagement in which a spring 36, such as a spring washer, is disposed between the machine mounting member's first end portion 12A and the sensor module mounting member's enlarged head portion 14B. It will be appreciated that the spring 36 loads the sensor module mounting member 14 to ensure positive axial retention notwithstanding possible component fit mismatches due to manufacturing tolerances. Notwithstanding the benefits of the spring 36, direct engagement between the machine mounting member first end portion 12A and the enlarged head portion 14B of the sensor module mounting member could be implemented by removing the spring to allow touching interfacial contact.

Figure 5:
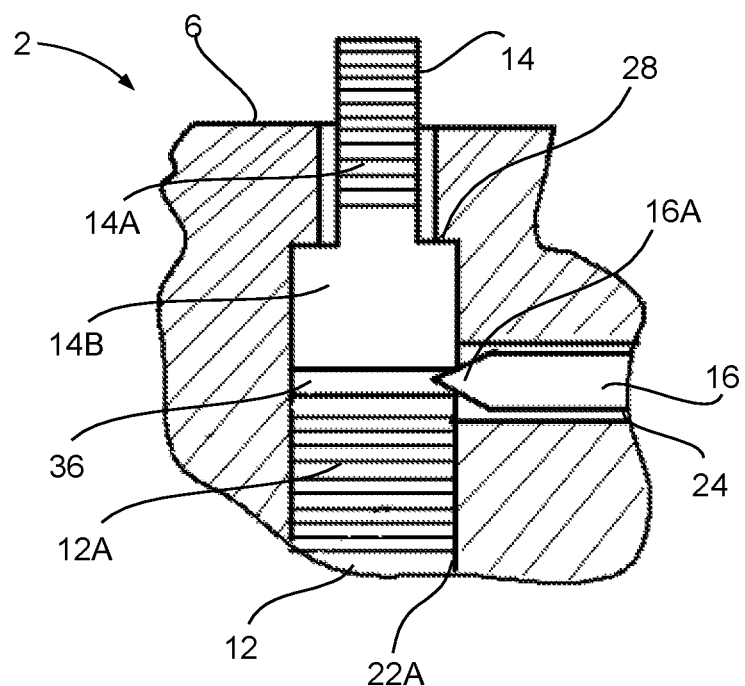
FIG. 5 is a partial combination cross-sectional view/side view of the universal sensor mount as illustrated in FIG. 3, and depicting an alternate component arrangement.

FIG. 5 shows an alternative form of indirect engagement between the machine mounting member's first end portion 12A and the sensor module mounting member's enlarged head portion 14B. In this embodiment, the first end portion 12A of the machine mounting member 12 is separated from the head portion 14B of the sensor module mounting member 14 by a gap 36 when the intermediate flange 12C (not shown in FIG. 5) seats against the second shoulder 34 of the first main body bore 22 (also not shown in FIG. 5). The adjustable locking member 16 may then be formed with a tapered (pointed) end 16A that adjustably inserts into the gap 34 as the locking member advances in the second main body bore 24. This results in opposite sides of the tapered end 16A respectively engaging the sensor module mounting member's enlarged head portion 14B and the machine mounting member's first end portion 12A. Continued advancement of the tapered end 16A will then exert a spring load that forcibly urges the enlarged head portion 14B of the sensor module mounting member 14 against the first shoulder 28 of the enlarged portion 22A of the first main body bore 22. This axially constrains the sensor module mounting member from moving toward the second end 8 of the main body 4 while ensuring positive axial retention notwithstanding possible component fit mismatches due to manufacturing tolerances.

Figure 6:
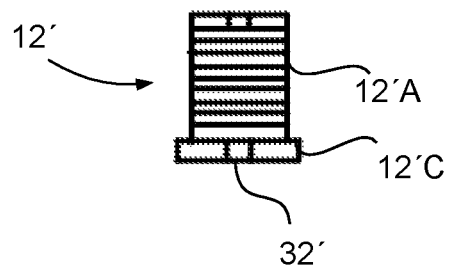
FIG. 6 is side view of a machine mounting member of the universal sensor mount of FIG. 1, according to an alternate embodiment thereof.

The machine mounting member 12 may be configured for one of either removable threaded attachment or permanent attachment to a machine (such as the motor 46 described below in connection with FIG. 13). FIG. 4 illustrates a threaded attachment embodiment and FIG. 6 illustrates a permanent attachment embodiment. In FIG. 4, the machine mounting member second end portion 12B is threaded in order to facilitate attachment into a corresponding threaded bore (not shown) on the machine. In FIG. 6, a modified machine mounting member 12' includes a first end portion 12'A and an end flange 12'C that represents a second end portion of the machine mounting member. The end flange 12'C is used as a mounting surface that can be permanently attached to the body of the machine, such as by using a suitable adhesive. It will also be seen that a screwdriver slot 32' or other suitable rotation-tool-receiving configuration may be formed in the end flange 12C to facilitate insertion of the machine mounting member 12' into the enlarged portion 22A of the first main body bore 22.

Figure 7:
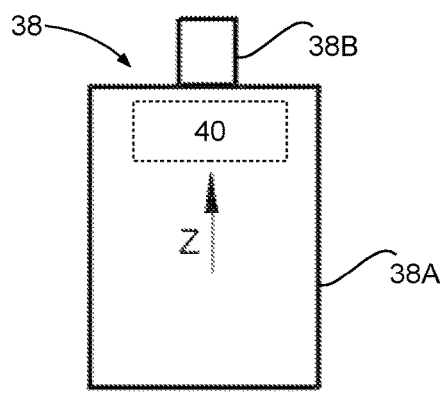
FIG. 7 is a side elevation view of an example three-axis sensor module that may be mounted to a machine using the sensor mount of FIG. 1.
Figure 8:
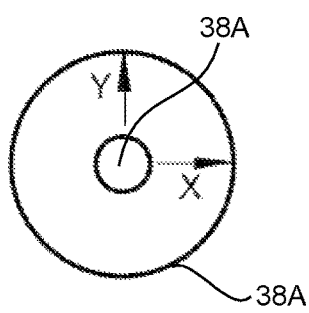
FIG. 8 is a top view of the three-axis sensor module of FIG. 7.
Figure 9:
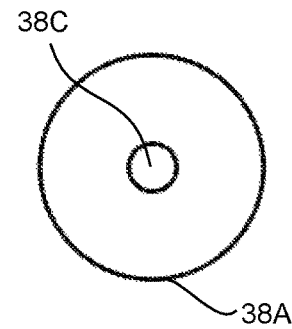
FIG. 9 is a bottom view of the three-axis sensor module of FIG. 7.

Turning now to FIGS. 7-9 and 10-12, two different types of sensor module are illustrated that may be mounted to a machine using the universal sensor mount 2. FIGS. 7-9 show a three-axis sensor module 38. The sensor module 38 includes a substantially cylindrical sensor module body 38A that carries an internal three-axis sensor 40. The sensor 40 may be implemented using any suitable sensing technology, including as a MEMS accelerometer that senses mutually orthogonal vibratory acceleration components in the illustrated X, Y and Z vector directions. For many applications, it is critical that the sensing axes of the sensor module 38 be substantially aligned with the corresponding X, Y and Z acceleration vector components of the machine on which the sensor module is to be mounted. As will be described in more detail below, the universal sensor mount 2 is ideally suited for precision mounting of the sensor module 38 in a very specific and highly controllable direction.

The sensor 40 outputs electrical signals corresponding to the sensed physical parameters of the machine. These electrical signals are output from the sensor module 38 via an electrical connector 38B in electrical communication with a cable (not shown) that delivers the signals to remote signal processing circuitry (also not shown). FIGS. 7 and 8 illustrate that the connector 38B is aligned with the centerline Z axis of the sensor module's cylindrical body. FIG. 9 shows the bottom of the sensor module body 38A being formed with a sensor module mounting bore 38C. The mounting bore 38C may be a blind bore of relatively short length that is internally threaded for mounting onto the sensor module mounting member 14 of the universal sensor mount 2. The mounting bore 38C will normally be aligned with a centerline axis of the sensor module body 38A that extends in the Z vector direction.

Figure 10:
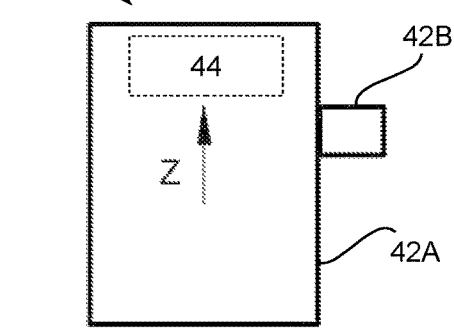
FIG. 10 is a side elevation view of an example single axis/side-connector sensor module that may be mounted to a machine using the sensor mount of FIG. 1.
Figure 11:
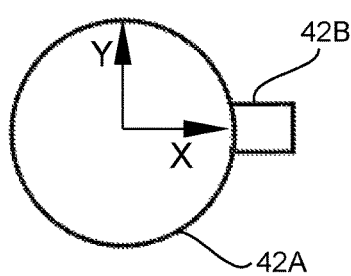
FIG. 11 is a top view of the single axis/side-connector sensor module of FIG. 10.
Figure 12:
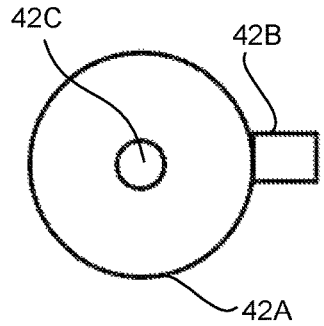
FIG. 12 is a bottom view of the single axis/side-connector sensor module of FIG. 10.

FIGS. 10-12 show a single-axis sensor/side-connector module 42. The sensor module 42 includes a substantially cylindrical sensor module body 42A that carries an internal single-axis sensor 44. The sensor 44 may be implemented using any suitable sensing technology, including a MEMS accelerometer that senses vibratory acceleration components in the illustrated Z vector direction. The sensor 40 outputs electrical signals corresponding to the sensed physical parameter. These electrical signals are output from the sensor module 42 via an electrical connector 42B in electrical communication with a cable (not shown) that delivers the signals to remote signal processing circuitry (also not shown).

FIGS. 11 and 12 illustrate that the connector 42B is a side-mounted component that extends substantially orthogonal to the centerline Z axis of the sensor module's cylindrical body 42A, namely, in the illustrated X vector direction. As can be seen in FIG. 11, the orientation of the connector 42B is dependent on the rotational orientation of the sensor module body 42A about its Z axis. In some operational environments, the connector 42A and the attached electrical cable (not shown) may need to extend in a particular direction due to limited space surrounding the sensor module 42. As will be described more detail below, the universal sensor mount 2 is ideally suited for precision mounting of the sensor module 42 in a very specific and highly controllable direction. FIG. 12 shows the bottom of the sensor module body 42A being formed with a sensor module mounting bore 42C. The mounting bore 42C may be a blind bore of relatively short length that is internally threaded for mounting onto the sensor module mounting member 14 of the universal sensor mount 2. The mounting bore 42C will normally be aligned with a centerline axis of the sensor module body 42A that extends in the Z vector direction.

Figure 13:
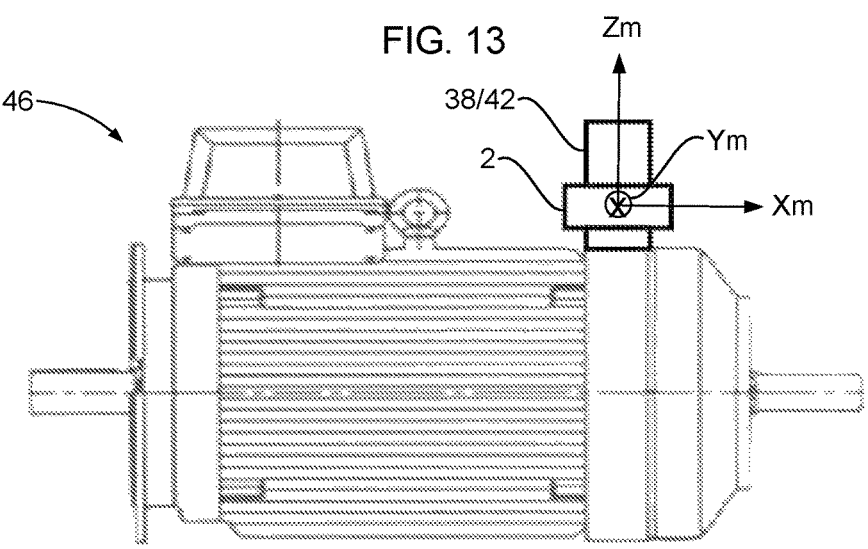
FIG. 13 is a side view of a motor representing an example machine to which the universal sensor mount may be attached.

Turning now to FIG. 13, an example machine 46 that may be implemented as an electric motor is shown. The machine 46 mounts the universal sensor mount 2, which in turn may mount either of the sensor modules 38 or 42. The machine 46 is shown as having mutually orthogonal machine reference axes Xm, Ym and Zm. Both the machine mounting member 12 and the sensor module mounting member 14 of the universal sensor mount 2 are inherently aligned with the Zm machine reference axis (due to the previously-described sensor mount geometry). So too are the mounting bores 38C and 42C of the sensor modules 38 and 42, depending on which module is mounted on the universal sensor mount 2. If the three-axis sensor module 38 is mounted on the machine 46, the references axes Xm, Ym and Zm may correspond to acceleration vector components of the machine that are to be sensed by the three-axis sensor 40. If the single axis/side-connector sensor module 42 is mounted on the machine 46, the reference axis Zm may represent an acceleration vector component of the machine that is to be sensed by the single-axis sensor 44. The Xm and Ym reference axes may represent direction indicators that can be used to align the side-mounted electrical connector 42B (and the electrical cable to be attached thereto) in a selected direction that does not result in interference with surrounding structure (also not shown). For example, the electrical connector 42B may need to be oriented along the Xm reference axis of the machine 46 in order to avoid such interference.

Figure 14A:
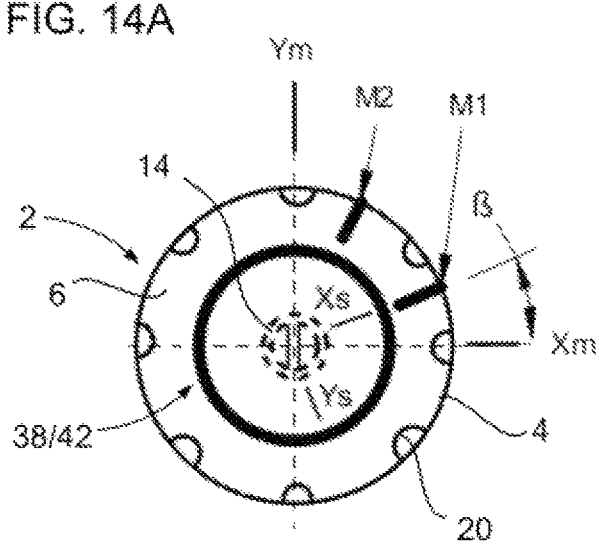
FIG. 14A is a diagrammatic top view showing a first phase of an adjustment sequence of the universal sensor mount of FIG. 1 in which a sensor module is attached on a sensor module mounting member of the universal sensor mount, and the sensor module mounting member is in an initial rotational position that results in the sensor module axes being offset from corresponding reference axes of a machine on which the sensor module is mounted.
Figure 14B:
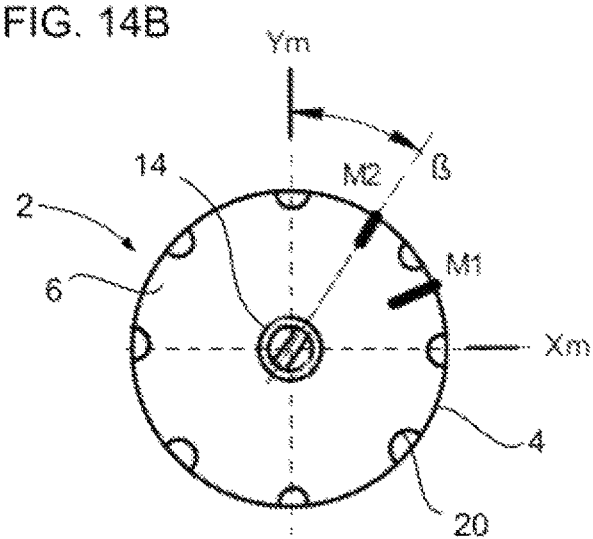
FIG. 14B is a diagrammatic top view showing a second phase of an adjustment sequence of the universal sensor mount of FIG. 1 in which the sensor module has been detached from the sensor module mounting member, and the sensor module mounting member has been selectively rotated from the initial rotational position of FIG. 14A to an adjusted rotational position.
Figure 14C:
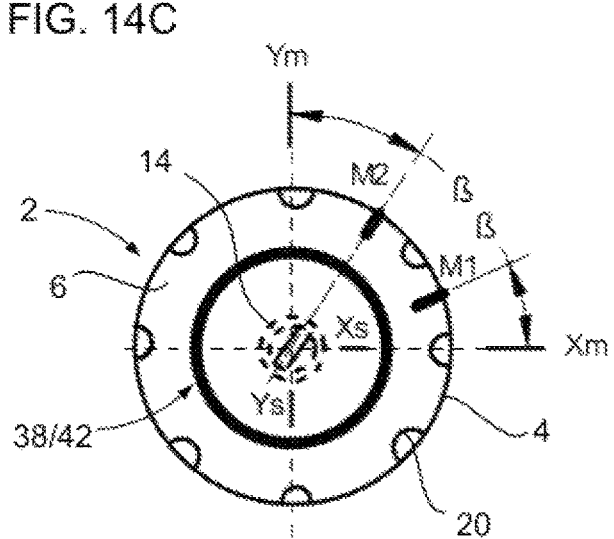
FIG. 14C is a diagrammatic top view showing at third phase of an adjustment sequence of the universal sensor mount of FIG. 1 in which the sensor module has been reattached to the sensor module mounting member and the sensor module axes are aligned with the corresponding reference axes of a machine on which the sensor module is mounted.

Turning now to FIGS. 14A-14C, a method will now be described for adjustably aligning the attached sensor module 38 or 42 in a selected orientation relative to one or more of the machine reference axes Xm and Ym of the machine 46 shown in FIG. 13. The reason the Zm machine reference axis is not mentioned is that the sensor module 38 or 42 will automatically align with this axis when it is first mounted on the universal sensor mount 2 (due to the inherent Zm-axis alignment of the machine mounting member 12, the sensor module mounting member 14, and the sensor module mounting bore 38C or 42C).

In FIG. 14A, the universal sensor mount 2 has been attached to the machine 46 (not shown) using the machine mounting member 12 (also not shown). Furthermore, the sensor module mounting member 14 has been rotated to an initial selected rotational position (which may be random) and locked using the adjustable locking member 16 (not shown). In addition, either the sensor module 38 or 42 has been attached to the universal sensor mount by placing its threaded bore 38C or 42C onto the sensor module mounting member 14 and rotating the sensor module until tight.

FIG. 14A illustrates that the sensor module 38 or 42 is not substantially aligned with the reference Xm and Ym axes of the machine 13. In particular, it may be determined by inspection that the initially-selected rotational position of the sensor module mounting member 14 has resulted in the X and Y axes of the sensor module 38 or 42 (respectively designated as Xs and Ys) being rotationally offset from the corresponding machine reference axes Xm and Ym. The magnitude of this rotational offset is the angle β. The offset direction is counterclockwise. Note that the sensor axes Xs and Ys are normally determinable from the sensor itself. Likewise, the machine reference axes Xm and Ym are normally determinable from the machine itself. Moreover, the universal sensor mount 2 may be installed on the machine 46 so that the rotation-indicating markings 20 on the main body 4 of the universal sensor mount are aligned with the machine reference axes Xm and Ym, as shown in FIG. 14A.

Once the installer determines that the sensor axes Xs and Ys are not substantially aligned with the respective machine reference axes Xm and Ym, the magnitude and direction of rotational offset may be noted. For example, the installer may place a mark on the first end 6 of the main body 4 that aligns with one of the sensor axes, such as the mark M1 in FIG. 14A that aligns with the Xs sensor axis. FIG. 14A shows that the mark M1 is offset from the Xm machine reference axis by the angle β, and that the offset angle direction is counter-clockwise. This means that to properly align the sensor module 38 or 42, it must be rotated clockwise by the angle β.

Turning now to FIG. 14B, the sensor module 38 or 42 has been detached from the universal sensor mount 2 by unthreading it from the sensor module mounting member 14. Moreover, the sensor module mounting member 14 has been unlocked using the adjustable locking member 16 (not shown), and has been rotated clockwise through the angle β to the desired rotational position that will substantially align the sensor axes Xs and Ys with the respective machine reference axes Xm and Ym. This operation is easily performed in the illustrated example because removal of the sensor module mounting member 14 will reveal that the rotation-indicating pointer 18 was initially aligned with the Ym machine reference axis. Knowing that the sensor mounting member 14 needs to be rotated clockwise by the angle β, the installer may measure this angle from the Ym machine reference axis. If desired, an optional second mark M2 may be placed on the first end 6 of the main body 4 at the measured location. The sensor module mounting member 14 may then be rotated until its rotation-indicating pointer 18 points to the mark M2, and then relocked at the selected rotational position using the adjustable locking member 16 (not shown).

Turning now to FIG. 14C, the sensor module 38 or 42 has been reattached to the universal sensor mount 2. It will be seen that sensor module axes Xs and Ys are substantially aligned with the machine reference axes Xm and Ym. Advantageously, if it becomes necessary to replace the sensor module 38 or 42, the universal sensor mount 2 may remain in place on the machine 13 and it will only be necessary to repeat the rotational adjustment operations shown in FIGS. 14A-14C to install the replacement sensor module.

Accordingly, a universal sensor mount and corresponding sensor module mounting method have been disclosed. Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A universal sensor mount for mounting a sensor module to a machine in a selected orientation relative to one or more machine reference axes, comprising:
    a main body having a central main axis;
    a machine mounting member extending from the main body in a first direction substantially parallel to the main axis;
    a threaded sensor module mounting member extending from the main body in a second direction substantially parallel to the main axis and disposed in a first main body bore;
    the sensor module mounting member being rotatable independently of the machine mounting member and relative to the main body through random rotational positions;
    an adjustable locking member movably disposed in the main body and positionable between a locking position of direct engagement with the sensor mounting member and an unlocking position of disengagement from the sensor mounting member, the adjustable locking member being disposed in a second main body bore intersecting the first main body bore, and having a sensor module mounting member engaging end that advances axially within the second main body bore to directly engage the sensor module mounting member and retracts axially within the second main body bore to disengage and separate from the sensor mounting member so as to be out of contact therewith;
    the sensor mounting member being rotatably lockable at each of its random rotational positions by way of locking engagement with the adjustable locking member so as to establish a selected rotational position; and
    the selected rotational position of the sensor module mounting member determining a rotational position of the sensor module relative to the one or more machine reference axes when it is threadably attached to the sensor module mounting member.

2. The universal sensor mount of claim 1, wherein the main body is a generally cylindrical member, and wherein the sensor module mounting member extends from a first end thereof and the machine mounting member extends from a second end thereof.

3. The universal sensor mount of claim 2, wherein the sensor module mounting member includes a rotation-indicating pointer for visually indicating the selected rotational position.

4. The universal sensor mount of claim 3, wherein the rotation-indicating pointer is formed as a rotation-tool-receiving key configured to be engaged by a rotation tool for rotating the sensor module mounting member.

5. The universal sensor mount of claim 3, wherein the main body has rotation-indicating markings on the first end thereof that the rotation-indicating pointer selectively points to at different rotational positions of the sensor module mounting member.

6. The universal sensor mount of claim 5, wherein a portion of the sensor module mounting member is disposed within the first main body bore extending axially within the main body and opening at the main body first end.

7. The universal sensor mount of claim 6, wherein the adjustable locking member includes a threaded shaft extending within the second main body bore that intersects the first main body bore, the threaded shaft being threadably adjustable to selectively engage and disengage the sensor module mounting member.

8. The universal sensor mount of claim 7, wherein the sensor module mounting member includes an enlarged head portion disposed within an enlarged portion of the first main body bore opening at the main body second end, the sensor module mounting member further including a threaded shaft extending through and out of the first main body bore beyond the main body first end.

9. The universal sensor mount of claim 8, wherein the sensor module mounting member is axially constrained against disengaging from the first end of the main body by virtue of the enlarged head portion engaging a first shoulder of the first main body bore that defines a closed end of the enlarged portion of the first main body bore.

10. The universal sensor mount of claim 9, wherein the sensor module mounting member is a threaded bolt.

11. The universal sensor mount of claim 9, wherein the machine mounting member includes a first end portion threadably attached to a threaded region of the enlarged portion of the first main body bore.

12. The universal sensor mount of claim 11, wherein the machine mounting member includes a second end portion having a rotation-tool-receiving configuration arranged to be engaged by a rotation tool that rotationally advances the machine mounting member into the enlarged portion of the first main body bore.

13. The universal sensor mount of claim 12, wherein the machine mounting member includes an intermediate flange disposed between its first and second end portions that seats on a second shoulder of the first main body bore that defines an open end of the enlarged portion of the first main body bore at the main body second end.

14. The universal sensor mount of claim 13, wherein the machine mounting member first end portion engages the head of the sensor mounting member when the intermediate flange seats against the second shoulder, either directly in touching interfacial contact or indirectly via an intermediate spring member, thereby axially constraining the sensor module mounting member from moving toward the second end of the main body.

15. The universal sensor mount of claim 13, wherein the machine mounting member first end portion is separated from the head of the sensor module mounting member by a gap when the intermediate flange seats against the second shoulder, and wherein a tapered end of the adjustable locking member adjustably inserts into the gap to exert a spring load on the head of the sensor module mounting member to forcibly urge it against the first shoulder of the enlarged portion of the first main body bore, thereby axially constraining the sensor module mounting member from moving toward the second end of the main body.

16. The universal sensor mount of claim 1, wherein the machine mounting member is configured for removable threaded attachment to the machine.

17. The universal sensor mount of claim 1, wherein the machine mounting member is configured for permanent adhesive attachment to the machine.

18. The universal sensor mount of claim 1, in combination with the sensor module mounted on the sensor module mounting member, the sensor module being operable to sense at least one physical parameter of a machine.

19. A universal sensor mount for mounting a sensor module to a machine in a selected orientation relative to one or more machine reference axes, comprising:
   a main body having a central main axis;
   a machine mounting member extending in a first direction substantially parallel to the main axis for attachment to the machine;
   a threaded sensor module mounting member extending in a second direction substantially parallel to the main axis for threaded attachment to the sensor module;
   the sensor module mounting member being rotatable relative to the main body;
   an adjustable locking member in the main body operable to lock the sensor module mounting member in a selected rotational position;
   the selected rotational position of the sensor module mounting member determining a rotational position of the sensor module relative to the one or more machine reference axes when it is threadably attached to the sensor module mounting member;
   the main body being a generally cylindrical member, and wherein the sensor module mounting member extends from a first end thereof and the machine mounting member extends from a second end thereof;
   the sensor module mounting member including a rotation-indicating pointer for visually indicating the selected rotational position;
   the rotation indicating pointer being formed as a rotation-tool-receiving key configured to be engaged by a rotation tool for rotating the sensor module mounting member;
   the main body having rotation-indicating markings on the first end thereof that the rotation-indicating pointer selectively points to at different rotational positions of the sensor module mounting member;
   a portion of the sensor module mounting member being disposed within a first main body bore extending axially within the main body and opening at the main body first end;
   the adjustable locking member including a threaded shaft extending within a second main body bore that intersects the first main body bore, the threaded shaft being threadably adjustable to selectively engage and disengage the sensor module mounting member;
   the sensor module mounting member including an enlarged head portion disposed within an enlarged portion of the first main body bore opening at the main body second end, the sensor module mounting member further including a threaded shaft extending through and out of the first main body bore beyond the main body first end;
   the sensor module mounting member being axially constrained from disengaging from the first end of the main body by virtue of the enlarged head portion engaging a first shoulder of the first main body bore that defines a closed end of the enlarged portion of the first main body bore;
   the sensor module mounting member being a threaded bolt;
   the machine mounting member including a first end portion threadably attached to a threaded region of the enlarged portion of the first main body bore;
   the machine mounting member including a second end portion having a rotation-tool-receiving configuration arranged to be engaged by a rotation tool that rotationally advances the machine mounting member into the enlarged portion of the first main body bore;
   the machine mounting member including a flange that seats on a second shoulder of the first main body bore that defines an open end of the enlarged portion of the first main body bore at the main body second end;
   wherein the machine mounting member first end portion either directly or indirectly engages the head of the sensor mounting member when the flange seats against the second shoulder in order to axially constrain the sensor module mounting member from moving toward the first end of the main body; and
   the machine mounting member being configured for one of either removable threaded attachment to the machine or permanent adhesive attachment to the machine.

20. A method for mounting a sensor module to a machine in a selected orientation relative to one or more machine reference axes, the method comprising:
   providing a universal sensor mount that includes:
      a main body having a central main axis;
      a machine mounting member extending from the main body in a first direction substantially parallel to the main axis;
      a threaded sensor module mounting member extending from the main body in a second direction substantially parallel to the main axis and disposed in a first main body bore;
      the sensor module mounting member being rotatable independently of the machine mounting member and relative to the main body through random rotational positions;
      an adjustable locking member movably disposed in the main body and positionable between a locking position of direct engagement with the sensor mounting member and an unlocking position of disengagement from the sensor mounting member, the adjustable locking member being disposed in a second main body bore intersecting the first main body bore, and having a sensor module mounting member engaging end that advances axially within the second main body bore to directly engage the sensor module mounting member and retracts axially within the second main body bore to disengage and separate from the sensor mounting member so as to be out of contact therewith;
      the sensor mounting member being rotatably lockable at each of its random rotational positions by way of locking engagement with the adjustable locking member so as to establish a selected rotational position; and the selected rotational position of the sensor module mounting member determining a rotational position of the sensor module when it is threadably attached to the sensor module mounting member;

attaching the universal sensor mount to the machine using the machine mounting member;

locking the sensor module mounting member in a selected rotational position using the adjustable locking member;

attaching the sensor module to the universal sensor mount by threading the sensor module onto the sensor module mounting member until tight;

determining whether the sensor module is substantially aligned with one or more reference axes of the machine;

if not, detaching the sensor module from the universal sensor mount;

unlocking the sensor module mounting member and rotating it to another selected rotational position that will substantially align the sensor module with the one or more machine reference axes;

relocking the sensor module in the another selected rotational position; and reattaching the sensor module to the universal sensor mount.

* * * * *